Patented Dec. 31, 1940

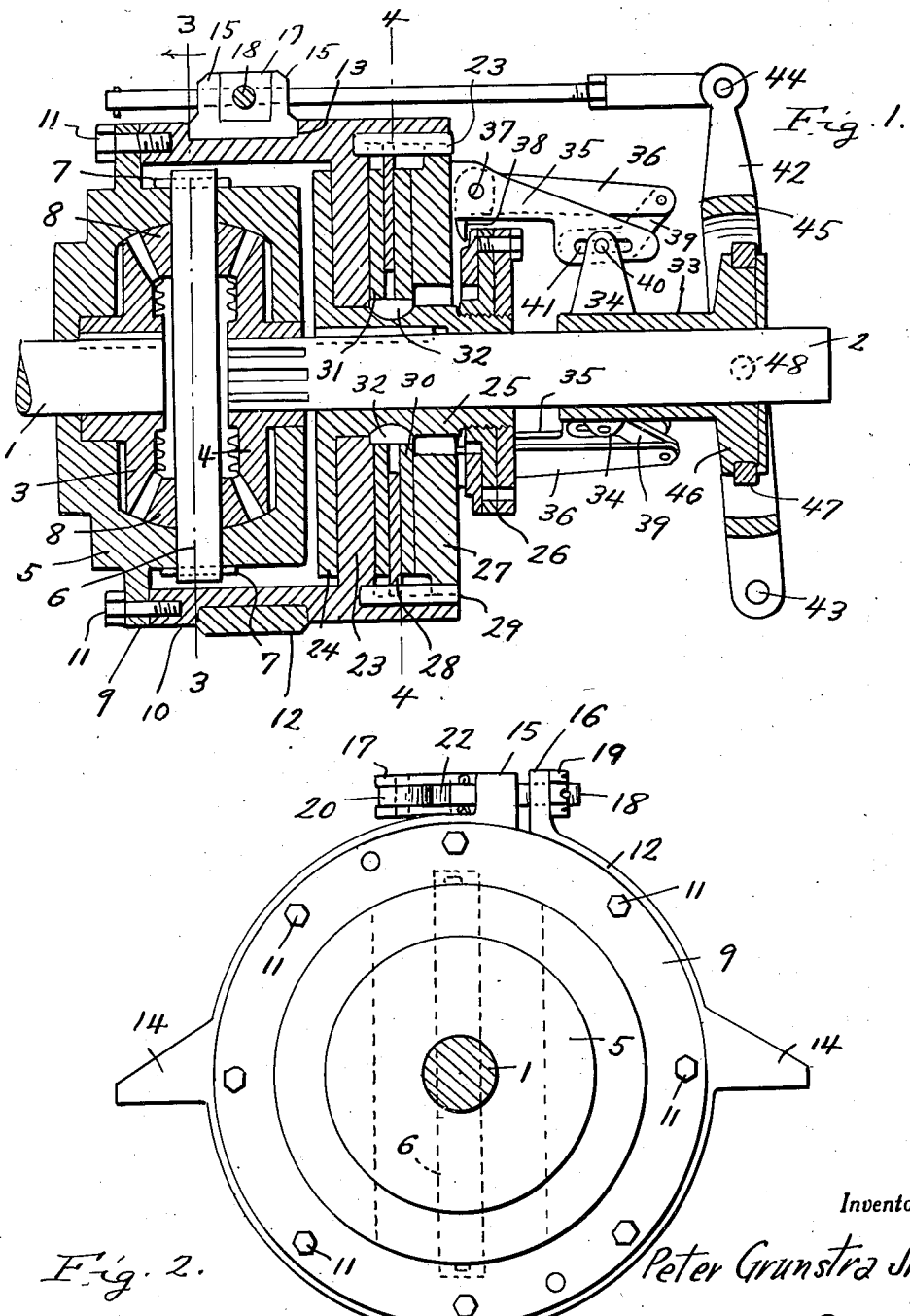

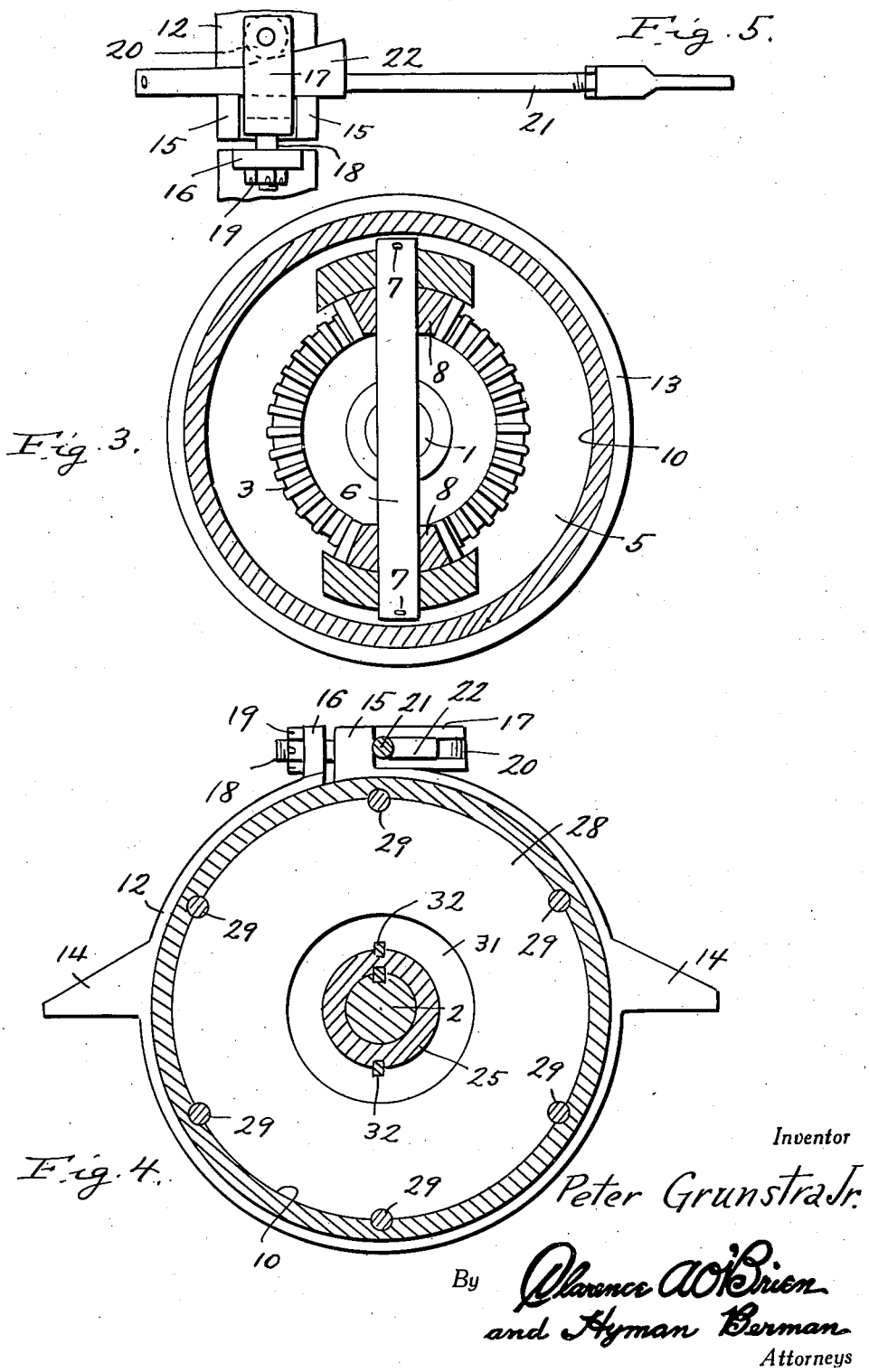

2,226,661

UNITED STATES PATENT OFFICE 2,226,661

REVERSE GEARING

Peter Grunstra, Jr., Clifton, N. J.

Application February 9, 1939, Serial No. 255,522

1 Claim. (Cl. 74—297)

The present invention relates to new and useful improvements in reverse gearings and has for its primary object to provide, in a manner as hereinafter set forth, a device of this character comprising a construction which is such that the driven shaft will be actuated in either direction at the same speed as the drive shaft.

Another very important object of the invention is to provide a reverse gearing of the aforementioned character comprising control means of a novel construction and arrangement.

Other objects of the invention are to provide a reverse gearing of the character described which will be comparatively simple in construction, strong, durable, highly efficient and reliable in operation, compact and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:

Figure 1 is a view in vertical longitudinal section through a reverse gearing constructed in accordance with the present invention.

Figure 2 is a view in front elevation of the device.

Figure 3 is a cross sectional view, taken substantially on the line 3—3 of Fig. 1.

Figure 4 is a cross sectional view, taken substantially on the line 4—4 of Fig. 1.

Figure 5 is a top plan view, showing means for operating the brake band.

Referring now to the drawings in detail, it will be seen that the embodiment of the invention which has been illustrated comprises a drive shaft 1 which may be connected with any suitable source of power, such as an engine. Aligned with the drive shaft 1 is a driven shaft 2. Keyed on the drive shaft 1 is a beveled gear 3. A substantially similar gear 4 is splined on the adjacent end portion of the driven shaft 2. A rotary case 5 encloses the gears 3 and 4. Mounted in the case 5 and extending between the opposed ends of the shafts 1 and 2 is a shaft 6 which is retained by cotter pins 7. Journaled on the shaft 6 in the case 5 are intermediate beveled gears 8 which operatively connect the gears 3 and 4.

Projecting from the periphery of the case 5 is an integral flange 9. The reference numeral 10 designates a drum which is secured to the flange 9 by stud bolts 11. As shown to advantage in Fig. 1 of the drawings, the drum 10 encloses the major portion of the case 5. Encircling the drum 10 is a brake band 12 which, when applied, is adapted to secure said drum against rotation. The drum 10 has formed in its periphery a channel 13 which receives the brake band 12. Brackets 14 are provided on the brake band 12 for mounting on a suitable support.

Rising from one end portion of the split brake band 12 is a pair of spaced lugs 15. Rising from the other end portion of the brake band 12 is an apertured ear 16. The reference numeral 17 designates a yoke having a shank 18 on its bight portion anchored in the ear 16 by a nut 19. Journaled in the yoke 17 is a roller 20. The reference numeral 21 designates a rod having a wedge 22 on one end slidable in the yoke 17 between the lugs 15 and the roller 20 for contracting the brake band 12 on the drum 10.

The drum 10 extends rearwardly beyond the case 5 and has formed therein an integral clutch flange 23. Frictionally engageable with the forward face of the clutch flange 23 is a clutch plate 24 having a rearwardly extending hub portion 25 which is keyed on the driven shaft 2. Mounted on the rear end portion of the hub 25 is a collar 26. Longitudinally shiftable clutch plates 27 and 28 are splined, as at 29, in the open rear end portion of the drum 10. The reference numerals 30 and 31 designate clutch plates which are splined on the hub 25, as at 32. It will be noted that the plate 31 is mounted between the plate 28 and the clutch flange 23 and that the plate 30 is mounted between the plates 27 and 28.

Slidably and rotatably mounted on the driven shaft 2 is a sleeve 33. Radiating from the forward end portion of the sleeve 33 are ears 34. Projecting rearwardly from the clutch plate 27 is a plurality of arms 35. The reference numeral 36 designates levers having one end pivotally connected to the forward portions of the arms 35, as at 37. Fingers 38 on the pivoted ends of the levers 36 are engaged with the collar 26 for operatively connecting said collar to said levers. Links 39 on the free ends of the levers 36 are pivotally connected to the ears 34 by pins 40. The rear end portions of the arms 35 extend between the ears 34 and the links 39. Formed in the rear end portions of the arms 35 are longitudinal slots 41 through which the pins 40 pass. In this manner the longitudinally slidable sleeve 33 is connected to the drum 10 for rotation therewith.

The reference numeral 42 designates a clutch and brake operating lever which is adapted to have one end 43 pivotally connected to a suitable support. The other end of the lever 42 is connected to the brake rod 21, as at 44. The lever 42 includes an annulus 45 which encircles the driven shaft 2 and the rear end portion 46 of the sleeve 33. The enlarged rear end portion 46 of the sleeve 33 is peripherally grooved and rotatably mounted therein is a ring 47. The ring 47 is rockably connected, as at 48, to the annulus 45. Thus, both the brake and clutch mechanisms are adapted to be actuated by the lever 42.

It is thought that the operation of the device will be readily apparent from a consideration of the foregoing. Briefly, with the brake and clutch elements disengaged the drum 10 and the case 5 are free to rotate and no motion is transmitted to the shaft 2. When forward drive of the shaft 2 with the shaft 1 is desired the lever 42 is swung rearwardly thus leaving the brake 12 disengaged but engaging the clutch elements through the links 39, the levers 36, the collar 26, etc., thereby locking the drum 10 to the shaft 2 and providing a direct drive from the shaft 1 to said shaft 2. When it is desired to reverse the shaft 2, the lever 42 is swung forwardly in a manner to release the clutch and apply the brake 12 thereby locking the drum 10 and the case 5 against rotation. When this occurs the shaft 2 is driven at the same speed as the shaft 1 but in the opposite direction through the gears 3, 8 and 4.

It is believed that the many advantages of a reverse gearing constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed is:

In a device of the class described, a casing, a shaft passing diametrically through the casing, beveled pinions carried by the shaft within the casing and spaced apart, a drive shaft extending into one end of the casing, a driven shaft extending into the opposite end thereof, beveled gears on said ends of the drive and driven shafts, said gears meshing with the beveled pinions, a drum having its front and rear ends open with an intermediate partition in the drum having a hole therein through which the driven shaft passes, a flange on the casing connected with the front end of the drum, a brake band surrounding the drum, a sleeve passing through the hole in the partition and keyed to the driven shaft, a plate connected to the front end of the sleeve and contacting the front face of the partition, clutch plates connected with the sleeve and the rear part of the housing, respectively, and overlapping each other, a lever, means for connecting one end of the lever to the brake band, means including a sleeve on the driven shaft for actuating the clutch means and means for moving the sleeve longitudinally by said lever.

PETER GRUNSTRA, Jr.